H. H. WHITEHEAD.
INTERNAL EXPLOSION ENGINE.
APPLICATION FILED NOV. 1, 1916.
1,248,965.
Patented Dec. 4, 1917.
2 SHEETS—SHEET 1.
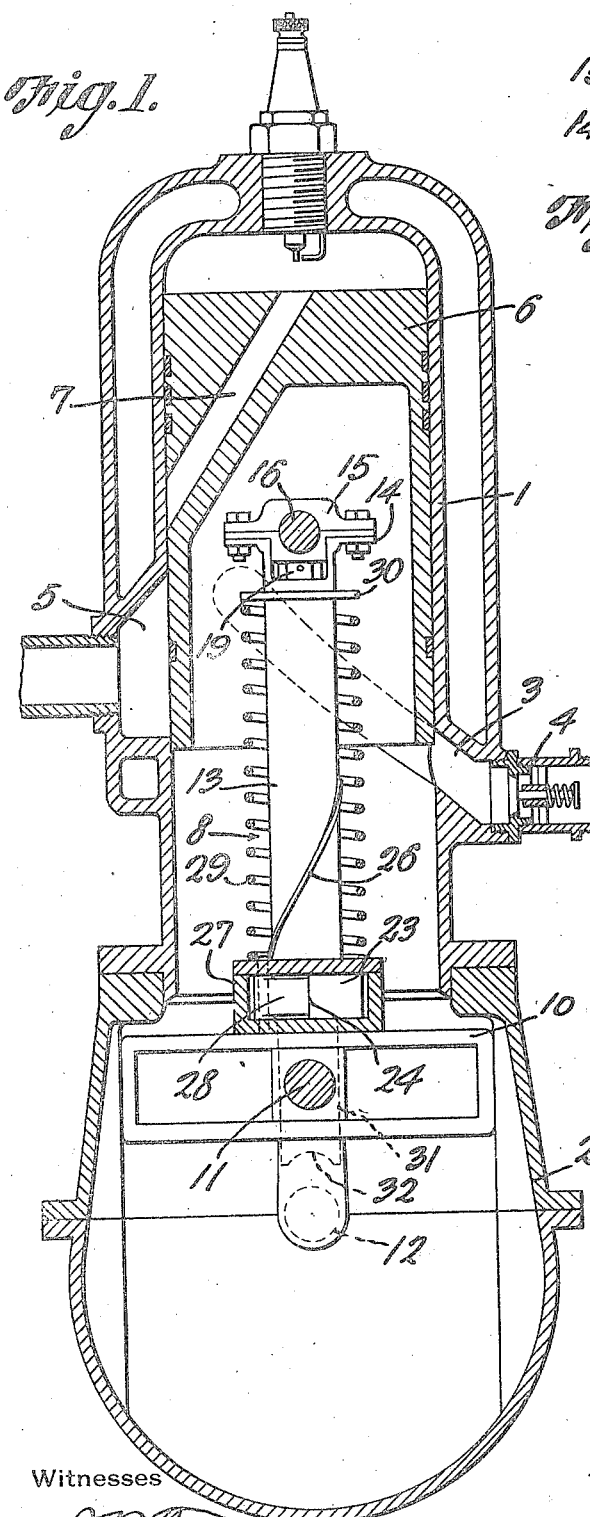
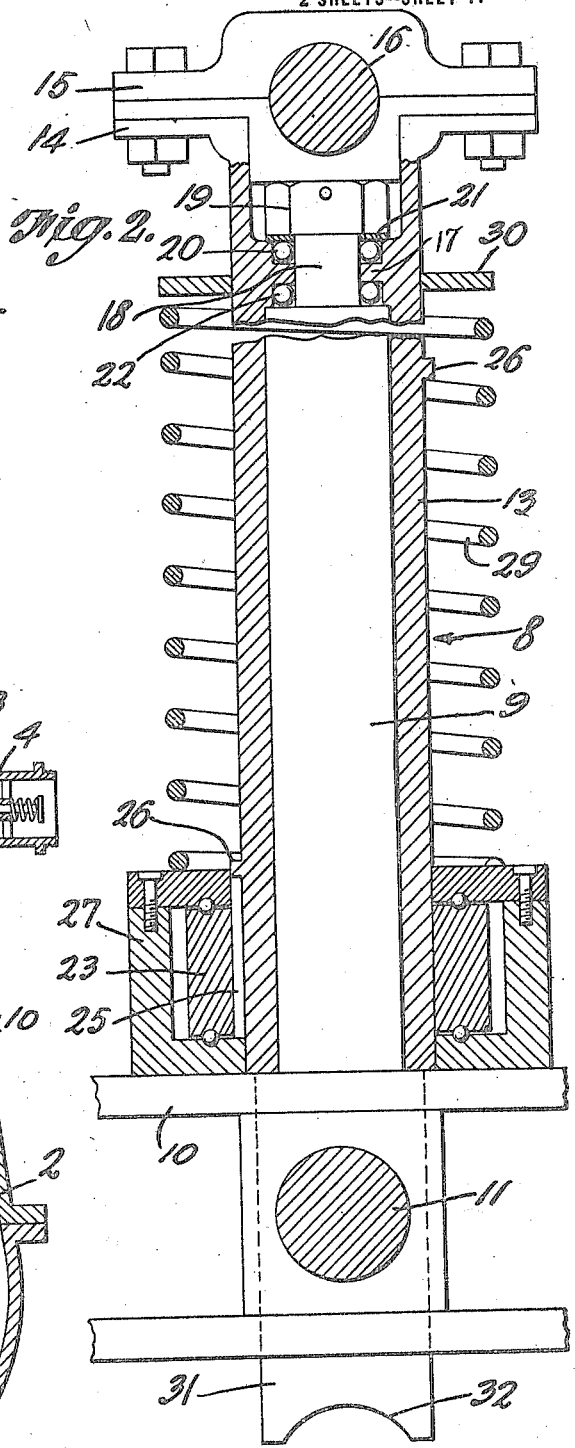
Witnesses
H. H. Whitehead, Inventor
by
Attorneys

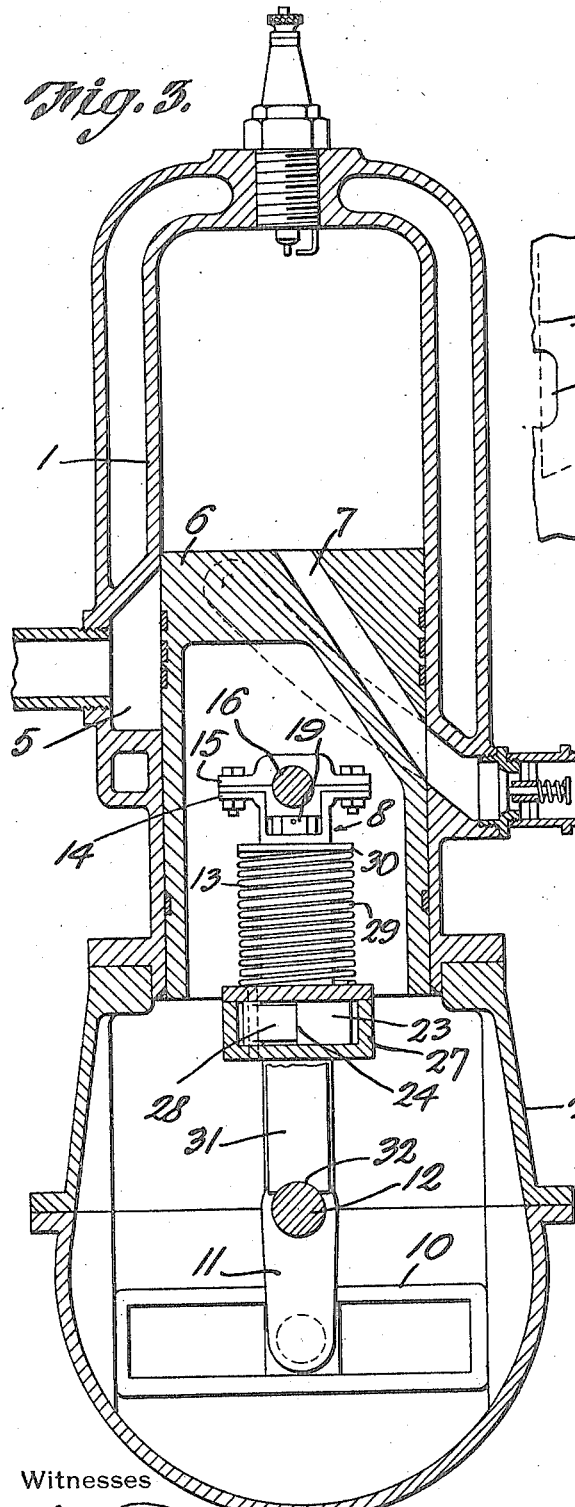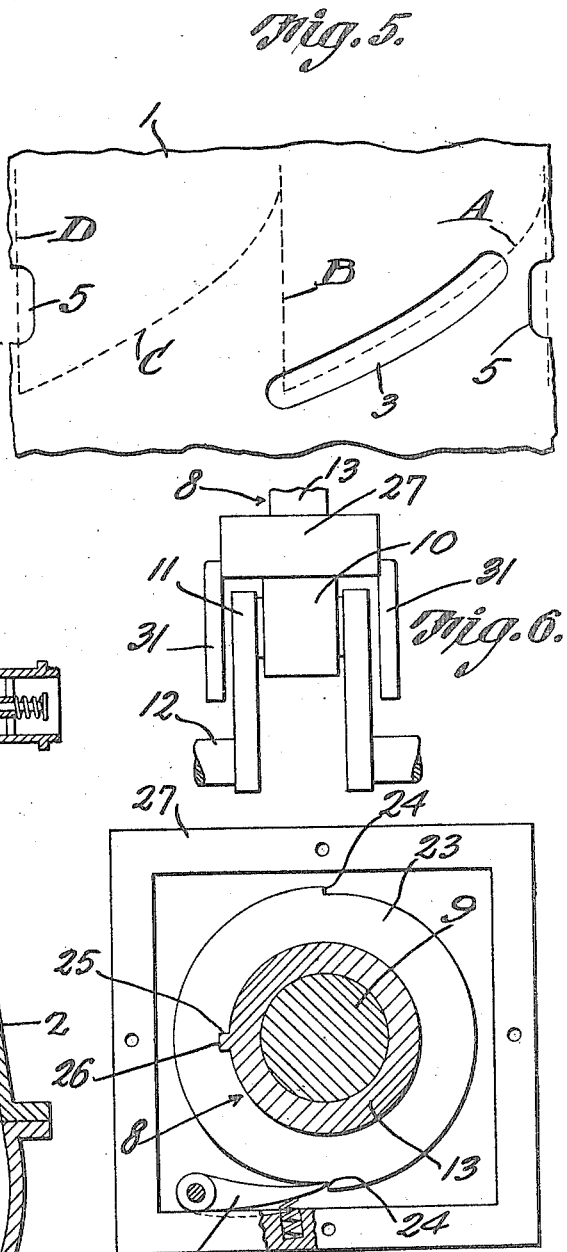

UNITED STATES PATENT OFFICE.

HUGH H. WHITEHEAD, OF ANNA MARIA, FLORIDA.

INTERNAL-EXPLOSION ENGINE.

1,248,965.   Specification of Letters Patent.   Patented Dec. 4, 1917.

Application filed November 1, 1916.   Serial No. 128,945.

*To all whom it may concern:*

Be it known that I, HUGH H. WHITEHEAD, a citizen of the United States, residing at Anna Maria, in the county of Manatee and State of Florida, have invented a new and useful Internal-Explosion Engine, of which the following is a specification.

The present invention appertains to internal explosion engines, and aims to provide a novel and improved valveless engine of the four cycle type.

It is the object of the invention to provide an engine wherein the piston in its movement serves to control the intake and exhaust, the piston being turned or rotated at intervals whereby to accomplish a four cycle action.

Another object of the invention is to provide novel means for effecting the turning or rotary movement of the piston at the proper times.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a vertical median section of the engine, showing the piston in a position to start its intake stroke.

Fig. 2 is an enlarged longitudinal section of the connecting rod.

Fig. 3 is a view similar to Fig. 1 showing the piston at the end of its intake stroke ready to move through its compression stroke.

Fig. 4 is a plan view of the ratchet device for turning the piston.

Fig. 5 is a diagrammatical view of the cylinder walls laid out flat illustrating the course of the port in the piston during the four cycles of operation.

Fig. 6 is a detail view illustrating the ratchet device in side elevation above the crank.

The engine illustrated includes but a single cylinder, although it will be understood that the present improvements can be employed in engines having any number of cylinders. The cylinder 1 is attached to the crank casing 2 as usual, and the cylinder is provided with a spiral intake port 3, there being a check valve 4 for preventing the escape of the mixture from the cylinder. The cylinder 1 is provided diametrically opposite the lower end of the port 3 with a vertical exhaust port 5. The piston 6 which reciprocates within the cylinder 1 is provided with an oblique port 7 extending from one wall thereof to its upper end, and the lower end of the port 7 is adapted to register alternately with the intake and exhaust ports due to the reciprocatory and rotatory movements of the piston.

A special connecting rod 8 is provided for the piston, the same including an inner non-rotatable member 9 provided at its lower end with a slotted yoke 10 in which the crank 11 of the crank shaft 12 works, so that the reciprocation of the connecting rod 9 imparts rotary movement to the crank shaft as usual. The crank shaft includes an outer tubular member 13 rotatable upon the inner member 9, but the two members are constrained to move longitudinally in unison. The tubular member 13 is provided at its upper end with flanges 14 upon which a sectional bearing 15 is secured by bolts or otherwise, said bearing 15 embracing the wrist pin 16 of the piston 6. The sleeve 13 can be rotated during the movement of the piston, for turning or rotating the piston. In order to constrain the members 9 and 13 to move longitudinally in unison, but to permit the member 13 to rotate, the tubular member 13 is provided near its upper end with an inner annular flange 17 forming annular ball races above and below the same, and the upper end of the member 9 has a reduced stem 18 extending through the aperture surrounded by the flange 17, and a nut 19 or other member is secured in any suitable manner upon the upper end of the stem 18. An annular series of anti-frictional balls 20 are disposed between the flange 17 and a washer 21 disposed underneath the nut 19, and a similar set of anti-frictional balls 22 are disposed between the upper end or shoulder of the member 9 and the bottom of the flange 17. Thus, an anti-frictional thrust bearing is provided between the members 9 and 13.

In order to effect the intermittent rotary movement of the member 13 during the downward strokes of the piston, a ratchet wheel 23 is mounted loosely upon the member 13, and is provided with diametrically opposite shoulders 24, and an inner groove 25 receiving a spiral flange or thread 26 with which the tubular member 13 is provided, said thread 26 extending through an arc of 180 degrees. The ratchet wheel 23 is disposed rotatably within a housing 27 mounted loosely upon the member 13, and a pawl or dog 28 is pivoted to the housing and is engageable with the shoulders 24, said pawl being spring pressed. A coiled wire expansion spring 29 surrounds the member 13 and is confined between the housing 27 and a collar 30 secured upon the member 13 near its upper end, whereby the spring 29 yieldably depresses the housing 27. The housing 27 is provided with opposite depending legs 31 provided with notches 32 at their lower ends seatable upon the crank shaft when the connecting rod moves downwardly, the housing 27 being non-rotatable in all positions thereof.

The operation of the engine is as follows:—Supposing that the piston is at the beginning end of its intake stroke, as illustrated in Fig. 1, the port 7 of the piston is in the longitudinal line of the exhaust port 5 but at a point above said exhaust port, which exhaust port is held closed by the piston. The thread 26 is moved upwardly above the housing 27 with its lower end in the groove 25 of the ratchet wheel 23, and the housing is raised with the yoke 10 against the tension of the spring 29. The pawl 28 is also in engagement with one of the shoulders 24 of the ratchet wheel. Now, when the piston moves downwardly through its intake stroke, the housing 27 together with the ratchet wheel 23 will move downwardly with the connecting rod until the legs 31 seat upon the crank shaft, which will stop the downward movement of the housing 27 and ratchet wheel 23 inclosed therein. Thus, after the piston has started downwardly, the ratchet wheel 23 is stopped in its movement, and the thread 26 of the tubular member or sleeve 13 therefore slides through the ratchet wheel 23, tending to rotate the ratchet wheel clockwise, as seen in Fig. 4, but since the movement of the ratchet wheel is prevented by the pawl 28 which engages one shoulder 24 of the ratchet wheel, said pawl being carried by the housing 27 which cannot rotate. Therefore, as the connecting rod is moved downwardly, the sleeve or tubular member 13 thereof is rotated through an arc of 180 degrees during the completion of the intake stroke of the piston, and the port 7 is therefore turned to communicate with the intake port 3 during the completion of the intake stroke, whereby the mixture will flow from the intake port 3 through the port 7 into the cylinder above the piston. When the piston completes its intake stroke, the port 7 is at the lower end of the intake port diametrically opposite the exhaust port 5. The movement of the port 7 during the intake stroke is indicated by the line A in Fig. 5. The piston is then moved upwardly through its compression stroke, but during the upward movement of the piston, it does not rotate, so that the port 7 moves upwardly away from the lower end of the intake port 3, as indicated by the line B in Fig. 5, the port 7 thereby being closed by the walls of the cylinder, so that the charge within the cylinder is compressed. The piston does not rotate during its upward movement due to the fact that when the connecting rod is raised, the tubular member 8 in sliding upwardly through the ratchet wheel 23 will rotate the ratchet wheel counter clockwise, as seen in Fig. 4, which is not resisted by the pawl 28 and the ratchet wheel can rotate freely within the housing 27 to prevent the rotation of the member 13 and piston during the upward movement thereof. During the completion of the upward movement of the piston, the housing 27 is raised with the yoke 10, and the ratchet wheel 23 is rotated through an angle of 180 degrees so that the pawl 28 engages the other shoulder 24. The port 7 is now in the vertical line of the lower end of the port 3, at the upper end of the line B in Fig. 5. Then, when the piston moves through the power or explosion stroke, the piston is again turned through one half of a revolution, as before, and as indicated by the line C in Fig. 5. The port 7 is closed by the walls of the cylinder during the power stroke, and when the piston reaches the end of the power stroke, the port 7 is in the vertical line of the exhaust port 5, so that when the piston moves through the exhaust stroke, it being kept in mind that the piston does not rotate during its upward movement, the port 7 moves past and registers with the exhaust port 5 so that the burnt gases are discharged through the exhaust port. When the piston reaches the end of its exhaust stroke, the four cycles are completed, and the piston assumes the position illustrated in Fig. 1 ready to move through the next intake stroke.

Having thus described the invention, what is claimed as new is:

1. An engine embodying a cylinder, a piston working therein and rotatable for controlling the flow of gas, a connecting rod connected to the piston, a member relatively to which the connecting rod is slidable, said member and connecting rod being connected whereby said member rotates the rod during their relative sliding movement, and means for preventing the rotation of said member during the movement of the connecting rod in one direction.

2. An engine embodying a cylinder, a piston working therein and rotatable for controlling the gas, a connecting rod connected to the piston, a ratchet wheel relatively to which the connecting rod is slidable and having a threaded connection therewith whereby said wheel rotates the rod when the connecting rod slides through the ratchet wheel, and a pawl for preventing the rotation of the ratchet wheel in one direction.

3. An engine embodying a cylinder, a crank shaft, a piston working in the cylinder and rotatable for controlling the flow of gas, a connecting rod having a non-rotatable member connected to the crank shaft and a tubular member rotatable upon said member and connected to the piston, a non-rotatable housing upon said tubular member, a ratchet wheel rotatable within the housing upon said tubular member, a pawl carried by the housing to engage the ratchet wheel and prevent the rotation thereof in one direction, and a thread carried by the tubular member engaging and working through the ratchet wheel.

4. An engine embodying a cylinder, a crank shaft, a piston working in the cylinder and rotatable for controlling the flow of gas, a connecting rod having a non-rotatable member connected to the crank shaft and a tubular member rotatable upon said member and connected to the piston, a non-rotatable housing upon said tubular member, a ratchet wheel rotatable within the housing upon said tubular member, a pawl carried by the housing to engage the ratchet wheel and prevent the rotation thereof in one direction, a thread carried by the tubular member engaging and working through the ratchet wheel, said housing being movable downwardly a short distance with the connecting rod and being stopped in its downward movement, and spring means for depressing the housing relative to said tubular member.

In testimony that I claim the foregoing as my own, I have hereto affixed my signature in the presence of two witnesses.

HUGH H. WHITEHEAD.

Witnesses:
H. R. GAINES,
DAVID D. COBB.